United States Patent
Zavadsky et al.

(10) Patent No.: US 11,489,901 B2
(45) Date of Patent: Nov. 1, 2022

(54) METHOD OF MEASURING THE QUALITY OF SERVICE IN A WIRELESS COMMUNICATIONS NETWORK

(71) Applicant: PRIVILEGE WIRELESS LLC, Suffern, NY (US)

(72) Inventors: Vyacheslav Zavadsky, Ottawa (CA); Alexander Poltorak, Monsey, NY (US)

(73) Assignee: PRIVILEGE WIRELESS LLC, Suffern, NY (US)

( * ) Notice: Subject to any disclaimer, the term of this patent is extended or adjusted under 35 U.S.C. 154(b) by 142 days.

(21) Appl. No.: 16/979,269

(22) PCT Filed: Mar. 8, 2019

(86) PCT No.: PCT/US2019/021341
§ 371 (c)(1),
(2) Date: Sep. 9, 2020

(87) PCT Pub. No.: WO2019/177889
PCT Pub. Date: Sep. 19, 2019

(65) Prior Publication Data
US 2020/0404042 A1    Dec. 24, 2020

Related U.S. Application Data

(60) Provisional application No. 62/641,675, filed on Mar. 12, 2018.

(51) Int. Cl.
*H04L 12/26*    (2006.01)
*H04L 65/80*    (2022.01)
(Continued)

(52) U.S. Cl.
CPC .......... *H04L 65/80* (2013.01); *H04L 65/1104* (2022.05); *H04L 65/65* (2022.05);
(Continued)

(58) Field of Classification Search
CPC ...................................................... H04L 65/80
See application file for complete search history.

(56) References Cited

U.S. PATENT DOCUMENTS 5,555,265 A * 9/1996 Kakuma ................. H04L 47/10
370/428
6,427,132 B1 * 7/2002 Bowman-Amuah .. G06Q 30/02
703/22

(Continued)

OTHER PUBLICATIONS

International Search Report and Written Opinion for Application No. PCT/US201 9/021341 dated Jun. 26, 2019.
(Continued)

*Primary Examiner* — Guang W Li
(74) *Attorney, Agent, or Firm* — Botos Churchill IP Law (57) ABSTRACT

The technology includes systems and methods for creating multi-tier cellular phone communications system with different tiers of quality levels of communication. According to one aspect the technology provides a phone application for monitoring call quality (FIG. 1). One or more processors monitor at least one of a bandwidth, a packet latency, a frequency, and network connectivity problems (FIG. 1, FIG. 7). The system then generates for display in the phone application the status of at least one of a bandwidth, a packet latency, a frequency, and one or more network connectivity problems (FIG. 1, FIG. 8).

21 Claims, 8 Drawing Sheets

(51) Int. Cl.
*H04W 4/16* (2009.01)
*H04W 8/18* (2009.01)
*H04W 24/08* (2009.01)
*H04W 28/20* (2009.01)
*H04W 28/24* (2009.01)
*H04L 65/65* (2022.01)
*H04L 65/1104* (2022.01)

(52) U.S. Cl.
CPC ............... *H04W 4/16* (2013.01); *H04W 8/18* (2013.01); *H04W 24/08* (2013.01); *H04W 28/20* (2013.01); *H04W 28/24* (2013.01)

(56) References Cited

U.S. PATENT DOCUMENTS

| | | | | |
|---|---|---|---|---|
| 6,731,625 | B1* | 5/2004 | Eastep | H04Q 3/0029 379/93.07 |
| 6,980,515 | B1* | 12/2005 | Schunk | H04L 45/00 370/230.1 |
| 8,396,468 | B1* | 3/2013 | Krinsky | H04W 24/00 455/67.11 |
| 9,544,201 | B2* | 1/2017 | Sanchez Vega | H04W 72/0493 |
| 10,009,479 | B2* | 6/2018 | Phillip | H04M 15/41 |
| 11,202,212 | B2* | 12/2021 | Karanam | H04M 3/42246 |
| 2002/0199203 | A1* | 12/2002 | Duffy | H04L 65/104 725/127 |
| 2003/0058922 | A1 | 3/2003 | Yutaka | |
| 2006/0168336 | A1* | 7/2006 | Koyanagi | H04L 47/2441 709/240 |
| 2008/0049775 | A1* | 2/2008 | Morrill | H04L 41/5003 370/419 |
| 2010/0062724 | A1* | 3/2010 | Fok | H04M 3/2236 455/67.11 |
| 2010/0166063 | A1* | 7/2010 | Perlman | H04N 21/2662 375/240.07 |
| 2011/0069625 | A1* | 3/2011 | Michaelis | H04L 65/601 370/252 |
| 2011/0103377 | A1* | 5/2011 | Hua | H04L 65/1053 370/352 |
| 2013/0301609 | A1* | 11/2013 | Smith | H04W 4/90 370/329 |
| 2014/0024338 | A1* | 1/2014 | Poltorak | H04W 72/085 455/406 |
| 2014/0066084 | A1* | 3/2014 | Paladugu | H04W 76/12 455/452.2 |
| 2014/0140497 | A1* | 5/2014 | Ripa | H04M 3/5175 379/265.06 |
| 2014/0297799 | A1* | 10/2014 | Gordon | H04N 21/23805 709/217 |
| 2016/0285946 | A1* | 9/2016 | Li | H04L 41/00 |
| 2017/0094015 | A1* | 3/2017 | Liang | H04L 67/2842 |
| 2017/0104867 | A1* | 4/2017 | Kim | H04M 3/568 |
| 2017/0181038 | A1* | 6/2017 | Yeddala | H04W 72/08 |
| 2017/0325141 | A1* | 11/2017 | Laliberte | H04W 80/08 |
| 2020/0022002 | A1* | 1/2020 | Karanam | H04M 3/2236 |
| 2021/0338973 | A1* | 11/2021 | Poltorak | G16H 20/13 |

OTHER PUBLICATIONS

Extended European Search received in EP Application No. 19768185.1 dated Nov. 11, 2021, 8 pp.

* cited by examiner

METHOD OF MEASURING THE QUALITY OF SERVICE IN A WIRELESS COMMUNICATIONS NETWORK

CROSS-REFERENCE TO RELATED APPLICATIONS

The present application is a national phase entry under 35 U.S.C. § 371 of International Application No. PCT/US2019/021341 filed Mar. 8, 2019, published in English, which claims the benefit of the filing data of U.S. Provisional Patent Application No. 62/641,675, filed Mar. 12, 2018, the entire disclosures of which are incorporated herein by reference.

FIELD OF THE INVENTION

The present invention relates generally to wireless communications, and, more particularly, to creating multi-tier cellular phone communications system with different tiers of quality levels of communication.

BACKGROUND OF THE INVENTION

The Quality of Service (QoS) in a multi-tier wireless communications network was considered by Poltorak et al. See, e.g., EP2286550; EP2292028; EP2286550; U.S. Pat. Nos. 8,224,289; 8,868,096; 8,725,129; 8,774,762; 8,989,717; EP2283674; EP2292028; 2723168; U.S. Pat. Nos. 9,743,311; 9,161,213; 9,253,680; 9,763,132; EP2983389; EP2283674; and EP2983389, which are incorporated herein by reference in their entirety.

Bandwidth is in short supply in wireless networks. Most of the bandwidth currently is used by various data applications, such as YouTube, Instagram, and SnapChat.

Voice and video communication remain an important function of wireless communication system. The voice and video communication traffic is extremely sensitive to delays, packet loss, and other network artefacts. To mitigate the network artefacts, real time communication traffic is normally granted QoS Class identifier 1 or 2, thereby receiving highest priority status below only basic control messages (see 3GPP TS 23.203 standard "Policy and Charging Control Architecture" incorporated herein by reference in its entirety).

Nevertheless, users of modern wireless system experience problems with quality of voice and video communication. Thus, a need exists for a more sophisticated solution to improve the voice quality. A further need exists to focus improvements in quality in accordance with a service tier in a multi-tier cellular communication network.

There is a widely accepted rule "you get what you measure." Thus, a solution to the wireless call quality issues requires measurement and monitoring of the call quality. Perceptual Objective Listening Quality Analysis (POLQA), also known as ITU-T Rec. P.863 is an ITU-T Standard incorporated herein by reference in its entirety covers a model to predict speech quality by means of analyzing digital speech signals. One of the disadvantages of POLQA that it operates by comparison of "ground truth," undistorted speech with output of the wireless handset. Such a comparison is not practical outside of special development/test environment.

Currently, the majority of voice communication in modern wireless networks occurs using VoLTE (Voice over LTE) protocol, incorporated herein by reference in its entirety, that uses SIP (Session Initiation protocol incorporated herein by reference in its entirety) to arrange for the calls and RTP (Real-time Transport Protocol incorporated herein by reference in its entirety) to transfer actual voice. RTP protocol is also widely used to transfer audio and video data in various other applications. A combination of SIP/RTP protocols is also widely used in most of the VoIP (Voice over IP), such as wired telephony.

SIP/RTP protocols suite provide a number of extensions to report on voice and network connection quality. RFC 6035, incorporated herein by reference in its entirety, provides for reporting voice quality using SIP messages such as PUBLISH and NOTIFY. Reporting may occur both during communication session and at the end of the communication session.

RFC 7002, incorporated herein by reference in its entirety, provides for reporting of packet loss information for an RTP session.

In Voice over IP (VoIP) applications, including VoLTE, voice fidelity depends not only on allocated bandwidth, but also on network-related factors such as network latency and its variations over time, packet loss and its variations over time, noise and so forth. Thus, just allocating additional bandwidth may still leave user with low quality audio signal, such as voice. RFC 5109 incorporated herein by reference in its entirety provides for using of forward error correction in RTP payload. The data encoded in a redundant way by using an error-correcting code (ECC), thus controlling errors in data transmission due to unreliable or noisy communication channels by using a portion of the bandwidth for redundancy. RFC 5109 provides different level of protection to different portions of RTP payload. For example, a lower fidelity/lower bandwidth portion of the stream can be transmitted with substantial redundancy, thereby allowing at least some level of the voice quality even during a peak with network noise/packet loss. A higher fidelity portion/higher bandwidth portion is encoded with less redundancy, thus providing less overall bandwidth expense.

However, applications may not be aware of the use of RFC 6035, 7002, 5109 or similar techniques in the context of VoLTE communication. Thus, bandwidth may not be used efficiently and client services can be adversely impacted as a result.

SUMMARY OF THE INVENTION

In accordance with one embodiment of the present invention, a method of providing telecommunication service in a wireless communication network, comprises: providing a "phone application" or "phone app" for short (i.e., a user interface to control telephony function) on a smartphone for monitoring a quality of the voice, monitoring bandwidth allocation, packet latency, voice compression, frequencies, and connectivity issues; and displaying the bandwidth allocation, packet latency, voice compression, frequencies, and connectivity issues on the phone app.

In accordance with one embodiment of the present invention, a method of providing telecommunication service in a wireless communication network comprises: providing a phone app on a smartphone for monitoring a quality of the voice delivered over the wireless communication network to the user during a call and network quality, checking the subscriber status of the user in a lookup table, determining if the user is a subscriber of higher-tier plan, treating the call with higher quality of service with less packet latency, more bandwidth, less compression, and allocation of frequencies less likely to suffer a connectivity issues.

In accordance with one embodiment of the present invention, a method of providing telecommunication service in a wireless communication network comprises: providing a phone app on a smartphone for monitoring a quality of the voice delivered over the wireless communication network to the user during a call; allowing the user to designate a call as important; designating the call as a higher-tier call; providing more bandwidth allocation, less packet latency, less compression, allocation of frequencies less likely to suffer a connectivity issues, and so forth. Dedication of the call as "high tier" may require subscription to a high tier plan, or may require agreement to one-time fee, or may be counted towards a quota. A person ordinary skilled in the art would understand that the "Phone app" shall include appropriate user interface elements to support informing users about his options and allowing to make appropriate choices.

A person skilled in the art would understand what enhancements to standard API on Android, iOS, and similar phone operating system shall be made to provide additional quality related information and settings to enable user interface described above.

Embodiments of the invention provide enhancements to SIP/RTP client used to enable VoLTE communication on a phone to provide one or more of the following:

Support a progressive codec. Progressive codec comprises at least two portions of progressively enhancing audio fidelity and bandwidth use.

Package the audio stream according to RFC 5109 or similar protocol to provide forward error correction. Embodiments may further provide progressively lower or no correction to higher fidelity portions of audio stream.

Provide reporting of voice quality to server using RFC 6035 or similar protocol. For example, a neural network can be trained to analyze incoming voice, environmental factors, and analyzing the speech for indications that quality is an issue (e.g., remarks like, "I cannot hear you"). Results of quality evaluations by neural network or another algorithm can be transferred to the server either on regular basis, or when quality drops and/or improves.

Provide reporting of RTP stream network quality assessment (packet loss, distortions, latency) using RFC 7002 or similar protocol.

Embodiments of the invention provide enhancements to policy/charge enforcement servers or another appropriate elements of network side architecture to provide one or more of the following:

Receive information about current voice quality, call designations, and bandwidth use.

Analyze importance of the call to the carrier based on factors such as customer subscription tier in a multi-tier network, customer designation of the call as "important," etc.

Determine a quality of service factor for a particular call based on the analyzed importance of the calls operating on network segment.

Transfer an indication of quality of service for a particular call or customer to appropriate base station (enhanced node B or eNodeB).

Provide appropriate billing records.

Embodiments of the invention provide enhancements to the enhanced node B or other appropriate elements of network side architecture to provide one or more of the following:

Allocate bandwidth according to quality of service factors of individual calls;

Monitor and statistically aggregate what combination of locations, velocities, and wireless frequencies are more likely to cause temporary connectivity issues;

Schedule packets taking into consideration quality of service to avoid combinations locations, velocities, and wireless frequencies are more likely to cause temporary connectivity issues.

DETAILED DESCRIPTION

The aspects, features and advantages of the present invention will be appreciated when considered with reference to the following description of exemplary embodiments and accompanying figures.

Figure 1:
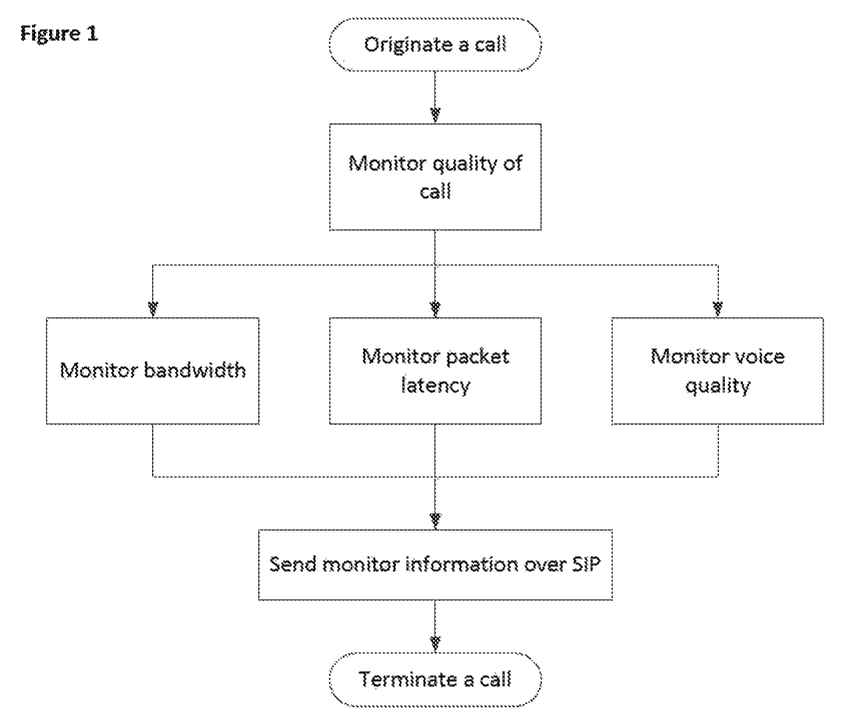
FIG. 1 illustrates a call monitoring flow diagram in accordance with aspects of the present invention.

FIG. 1 illustrates aspect of operation of a smartphone according embodiments of the invention. To enable high fidelity calling, call quality information is monitored. In embodiments of the invention, lower level information, such network latency, used bandwidth, and packet loss/distortion can be monitored and reported to the serving SIP server using RFC 7002. In some embodiments, higher level information, such as resulting voice quality, can be monitored and reported using RFC 6035.

Figure 2:
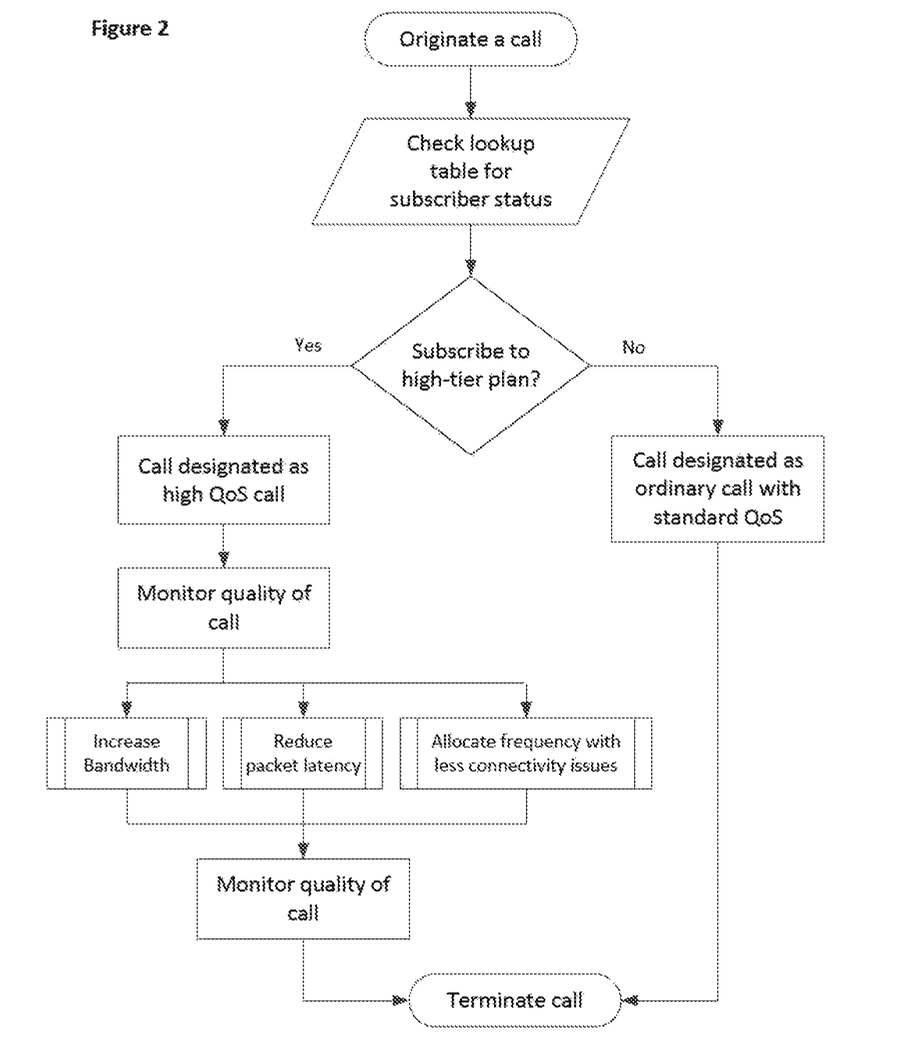
FIG. 2 illustrates a call monitoring flow diagram in accordance with aspects of the present invention.
Figure 3:
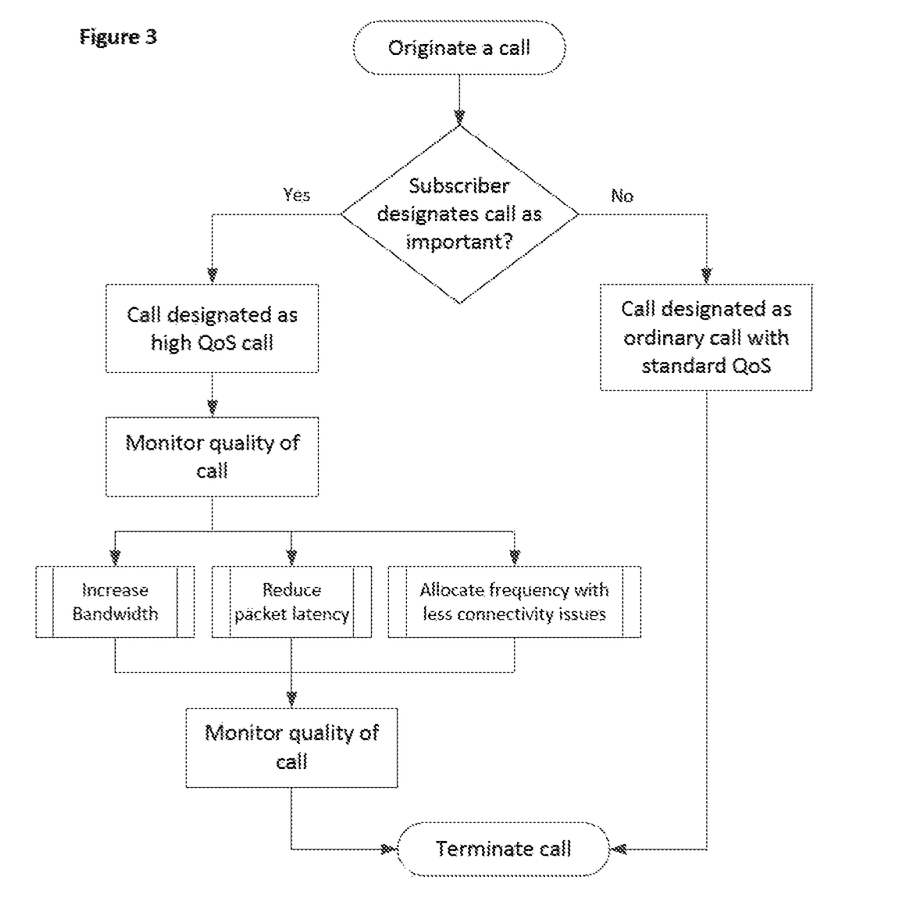
FIG. 3 illustrates a call monitoring flow diagram in accordance with aspects of the present invention.

FIGS. 2-3 illustrates aspect of operations of wireless network according to embodiments of the current invention. PCEF (Policy and Charging Enforcement Function) has information about privilege status of a particular call or a user, e.g., if a user is a subscriber of a higher tier plan. Such information can be stored in existing policy records, or in a separate table. In the embodiments, if policy dictates that call deserves a higher tier status, the call is assigned a higher level QoS (quality of service) value.

The policy to elevate the call status may depend on subscriber status (FIG. 2), on designation of a call by subscriber as important (FIG. 3), or on other factors, such as subscriber's call history, data usage, and retention status.

Further, in the embodiments of the invention, SIP server may receive quality monitoring information from UE (user equipment). In different embodiments, it may occur either for all the calls, or only the calls eligible for a higher tier status. Such monitoring information can be provided to PCEF functionality that may adjust QoS value during duration of the call.

In some embodiments, call monitoring can be used to create after-call record of a call quality. In the embodiments, such information can be stored with the call log or in separate table. Such information can be used for customer-relationship/customer retention purposes. For example, if there were a "one-off" call quality issue for a higher tier subscriber, an apology message could be sent to the user. Call logs with quality monitoring for all the users can be used to improve the network by correlating call quality with parameters such as geographical location, time of the day, frequency used, moving speed, etc. It can be used to improve customer retention by elevating privilege status of some calls to allow user to have their share of high quality calls.

Figure 4:
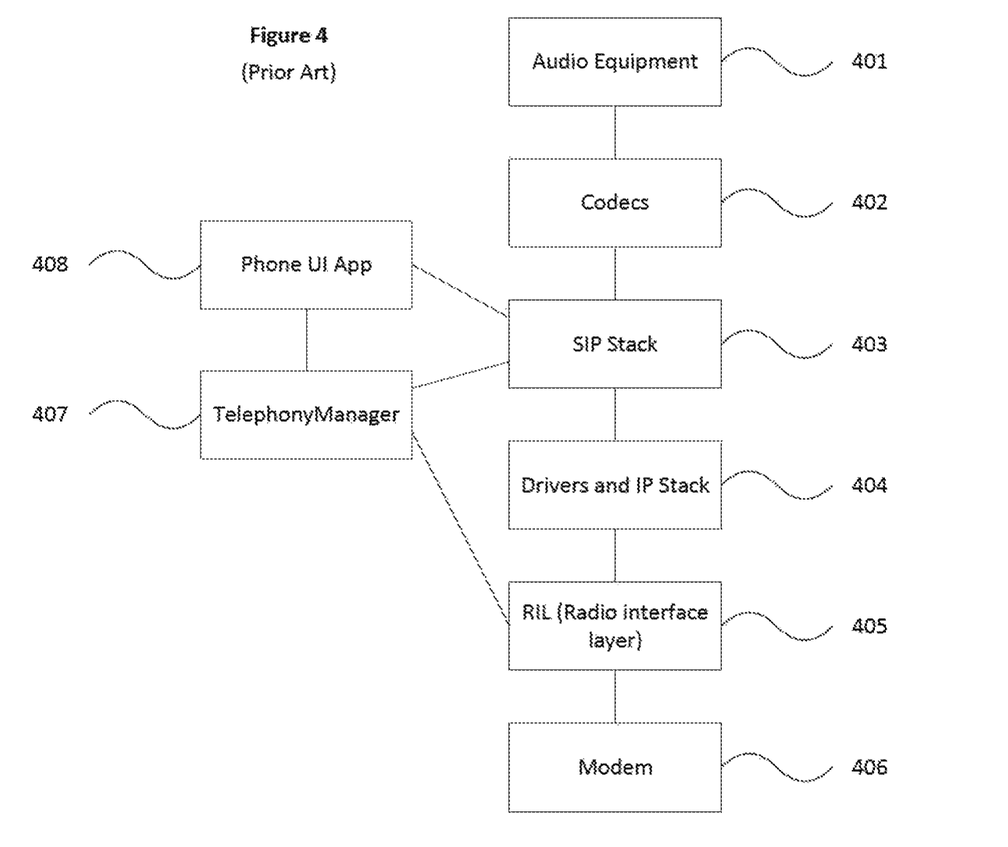
FIG. 4. illustrates aspects of prior art architecture of VoLTE related features on a smartphone.

FIG. 4 illustrates aspects prior art architecture of phone to support VoLTE calling. Phone UI App 408 (also known as a "Dialer app", "phone App") is used by the subscriber to initiate, answer and control the calls. It interacts with public and private API in the package android.telephony, for example with TelephonyManager 407. In addition to call control information, the API provides access to the functionality such as network selection, signal strength, carrier, etc. Documentation on some aspects of functionality of API is available on the Internet, and an example of which (TelephonyManager for Android developers) is attached as an appendix and incorporated herein by reference. SIP stack 403 is used to control the calls (using SIP protocol) and communicate actual audio data (using RTP protocol). Speakers and microphones (collectively, audio equipment 401) are used as audio interface with the subscriber. Audio is encoded (decoded) to a standard compressed form using codecs 402 that may have hardware, software, or mixed implementations. Modem 406 is used for radio communications, and is coupled with SIP stack through radio interface level 405 and drivers/IP stack 404.

Figure 5:
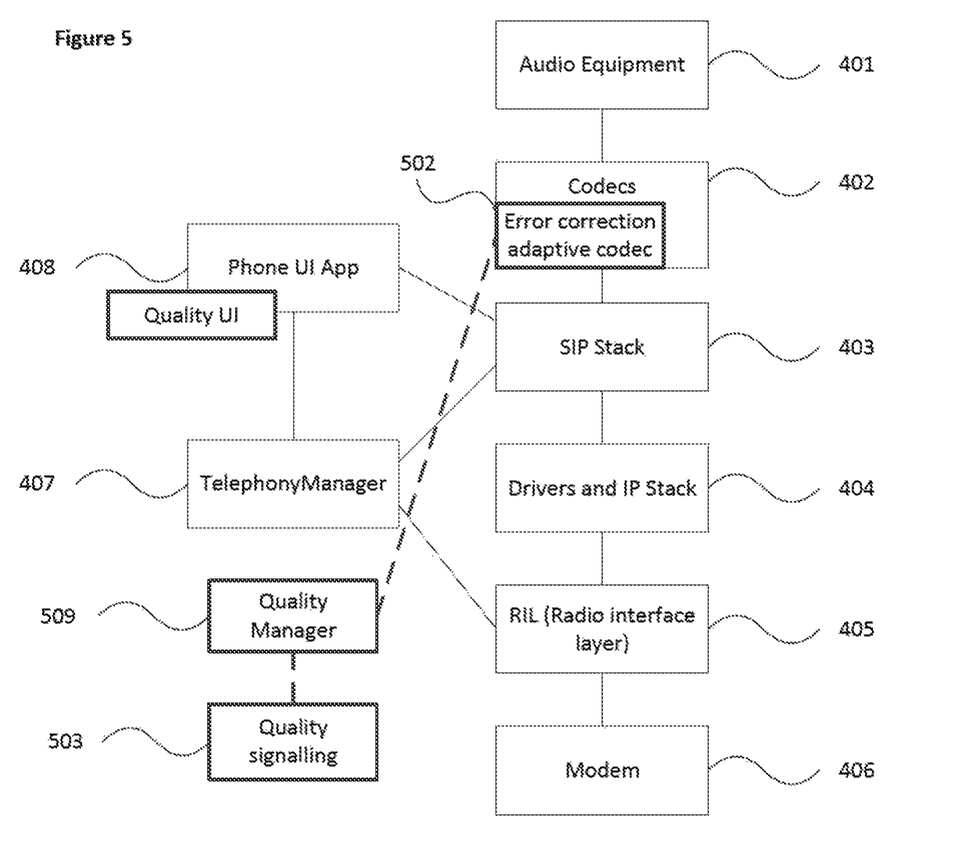
FIG. 5. illustrates aspects of the architecture of VoLTE related features on a smartphone according to some embodiments of the invention.

FIG. 5 illustrates improvements in the illustrative architecture of FIG. 4 according to the embodiments of the invention. Quality Manager 509 is a public API that is designed to handle call quality related information and commands. It includes functions to get current voice quality, to get network information pertinent to voice quality (allocated bandwidth, actual bandwidth, packet loss, latency, etc.); to get/set codec related information, to dedicate a call as privileged; etc. Further, it may include an abstract class or interface that, if implemented, would provide a way to integrate into voice client a custom call quality estimator. One skilled in the art would implement of Quality Manager 509 using the appropriate combination of public and private APIs and classes, as well as appropriate supports on other levels of software stack from settings to RIL, drivers, and kernel.

A person skilled in the art would recognize how to modify handset architecture different from FIG. 4 (for example, Apple's IOS handset) similarly with modifications of FIG. 5.

Figure 6:
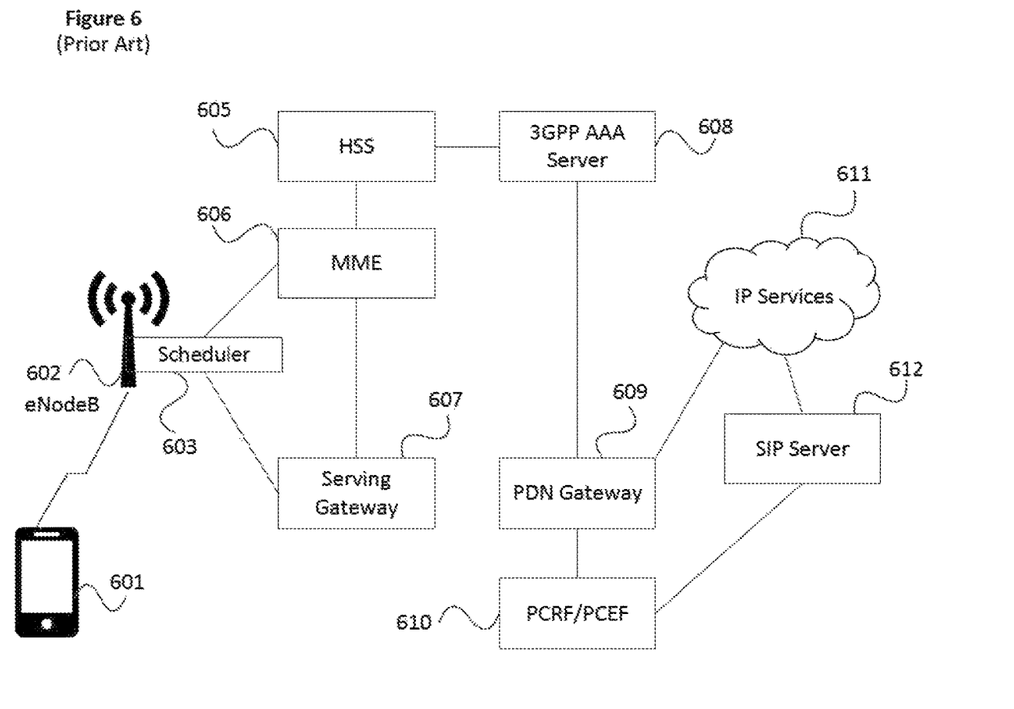
FIG. 6. illustrates aspects of prior art architecture of VoLTE related features on the carrier network.

FIG. 6 illustrates some aspects of handling VoLTE call by carrier network. A phone (also known as user equipment or UE) 601 wirelessly communicates with enhanced node B 602. A software component 603 called scheduler is responsible for rationing bandwidth and frequencies between multiple concurrently connected handsets. The HSS 605 (Home Subscriber Server) is the concatenation of the HLR (Home Location Register) and the AuC (Authentication Center). The HLR part of the HSS is in charge of storing and updating when necessary the database containing all the user subscription information. MME 606 (Mobility Management Entity) is in charge of all the Control plane functions related to subscriber and session management. From a functional perspective, the Serving GW is the termination point of the packet data interface towards E-UTRAN. When terminals move across eNodeB in E-UTRAN, the serving gateway 607 serves as a local mobility anchor, meaning that packets are routed through this point for intra E-UTRAN mobility and mobility with other 3GPP technologies, such as 2G/GSM and 3G/UMTS. An AAA 608 server is a server program that handles user requests for access to computer resources and, for an enterprise, provides authentication, authorization, and accounting (AAA) services. The AAA server typically interacts with network access and gateway servers and with databases and directories containing user information. The current standard by which devices or applications communicate with an AAA server is the Remote Authentication Dial-In User Service (RADIUS) or its improved version DIAMETER. Similarly to the Serving GW, the PDN gateway (609) is the termination point of the packet data interface towards the Packet Data Network. As an anchor point for sessions towards the external Packet Data Networks, the PDN GW also supports Policy and Charging Rules Function and Policy and Charging Enforcement Function 610 (which apply operator-defined rules for resource allocation and usage) as well as packet filtering (like deep packet inspection for virus signature detection) and evolved charging support (like per URL charging). IP network and associated services 611 used to connect to SIP server 612 that manages actual VoLTE calls.

Figure 7:
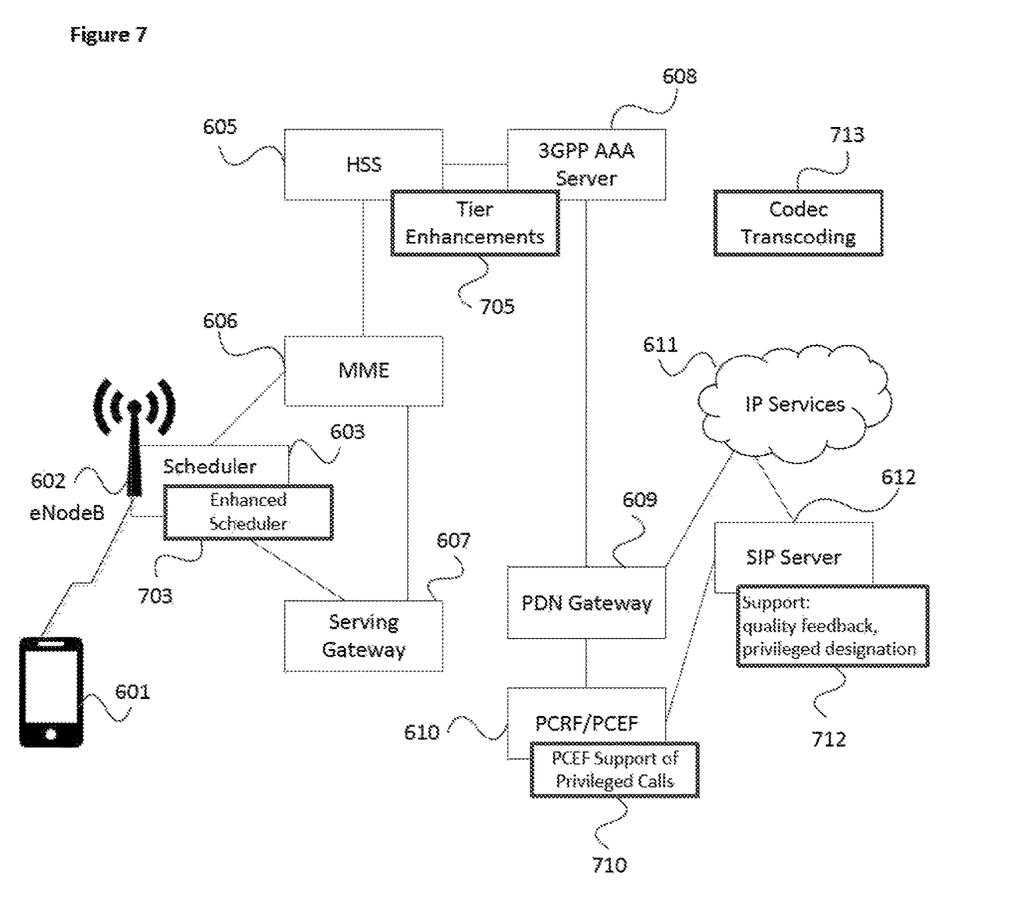
FIG. 7. illustrates aspects of the architecture of VoLTE related features on the carrier network to some embodiments of the invention.

FIG. 7 illustrates enhancements that can be implemented based on architecture of FIG. 6 in the embodiments. HSS 605 and 3GPP AAA 608 are enhanced with "Tier enhancements" 705. In embodiments, this may include enhancing subscribers' database to include information about tier status of a subscriber, its allowance of high privileged calls, history of call quality, etc. This information is propagated to PCEF/PCRF function 610 using, for example, diameter protocol. PCEF/PCRF function determine privilege status of a call and setup QoS value accordingly using block 710.

In the embodiments, PDN gateway 609 may use privilege status information from PCRF/PCEF 610, 710 or QoS value to shape packet traffic accordingly.

In the embodiments, QoS value or other suitable privilege information is propagated to the packed scheduler of eNodeB 602. A legacy, known in the art scheduler, can shape the traffic based on QoS value. In other embodiments, the scheduler can be enhanced to more aggressively guarantee bandwidth allocation to a higher status call. In the embodiments, enhanced scheduler 703 collects, analyzes, and uses information about connectivity quality based on used frequencies, subscriber location, and velocity; and allocate to high status calls frequencies that are less likely to suffer from the connectivity problems. In the embodiments, the scheduler may allocate to the packets of a high status call two or more distinct frequencies. Combined with error correction coding of high status calls, it will guarantee acceptable call quality even in case of interference on one or more frequencies.

In the embodiments according to aspects of the invention, the phone's codec 502 may implement an error correction adaptive payload according to RFC 5109 or similar one. In the case current phone call is with party that does not support such a codec, the call's RTP stream would first terminate to transcoding codec 713. It would produce error corrected ordinary stream for other party and would insert error correction for the RTP stream going down to UE 601. If other party supports error correction, the call may go either through transcoder 713, or directly to other party.

As discussed above, in the embodiments phone 601 may implement monitoring of call quality using, for example SIP signaling. In this case, this signaling terminates at SIP server 612 and module 712, based on the signaling, provides call quality feedback to modules responsible to implement QoS, such as eNodeB 603 of PDN gateway 609. The allocated bandwidth and other parameters will be adjusted based on the feedback. In embodiments call quality signaling encoded in SIP or other suitable protocol can terminate at other suitable modules, e.g. on modules implementing QoS.

Figure 8:
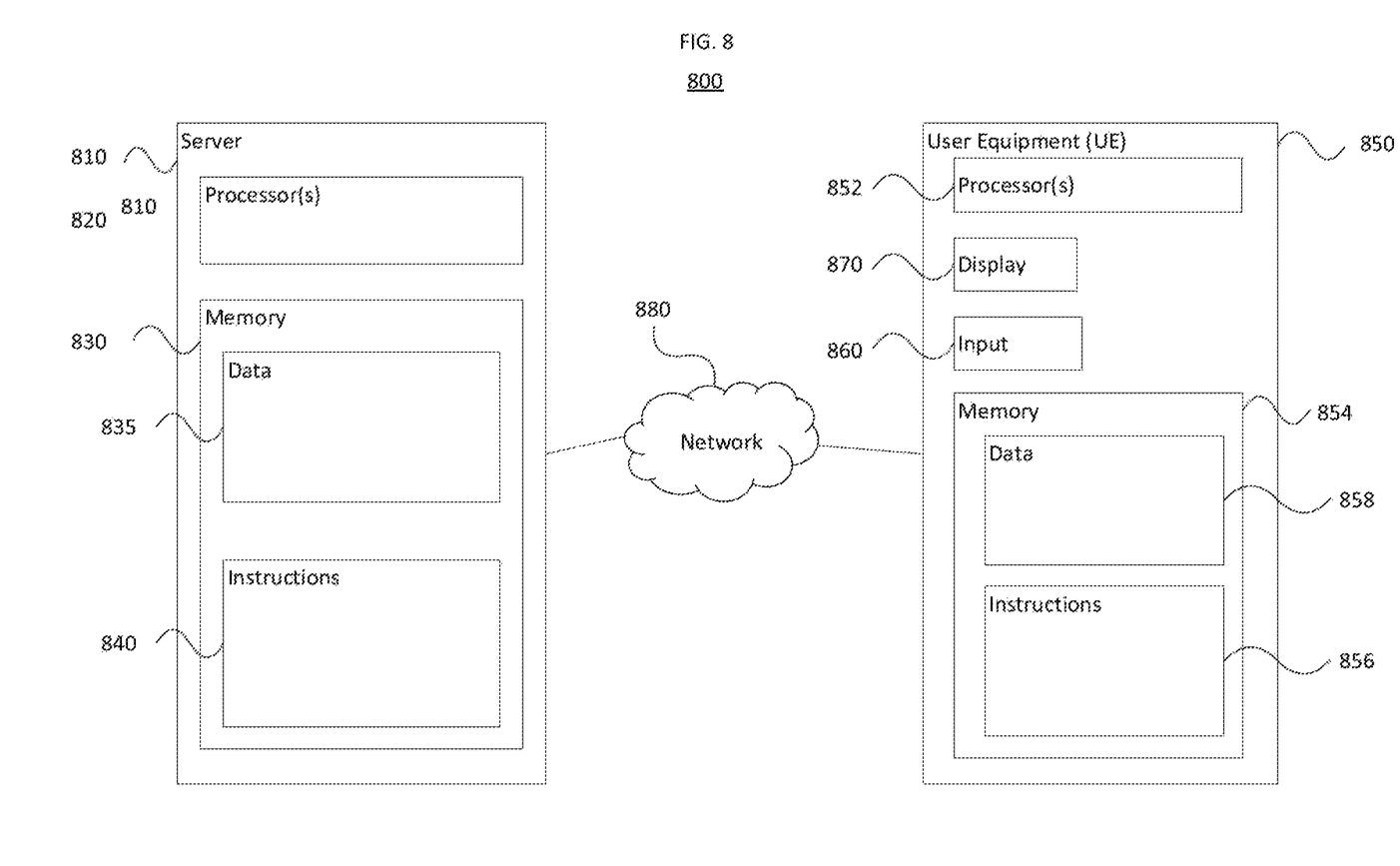
FIG. 8 illustrates a network arrangement for use in accordance with aspects of the invention.

FIG. 8 provides an exemplary system 800 in which aspects of the above-described technology may be implemented. For example, the system 800 may include one or more servers 810 each containing at least one processor 820, memory 830 and other components typically present in a computer. The server may be associated with a particular wireless communication network, in which case it may be in operative communication with or operatively coupled to a mobile telephone switching office or mobile switching center. The server(s) 810 may implement features of the various gateways, servers and eNodeBs described above and shown in figures.

The memory 830 stores information accessible by processor(s) 820, including instructions 840 that may be executed by the processor(s) 820 and data 835 that may be retrieved, manipulated or stored by the processor(s). The memory 830 may be of any type capable of storing information accessible by the processor, such as a hard-drive, ROM, RAM, CD-ROM, high-density tape memories, write-capable or read-only memories, etc.

The processor(s) 820 may comprise any number of well-known processors, such as processors from Intel Corporation. Alternatively, the processor may be a dedicated controller for executing operations, such as an ASIC. The instructions 840 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The quality service level information may be a short code that indicates which quality class of service is purchased by a subscriber. The security level may be coded together with signal quality information, or may be a separate code. The functions, methods and routines of instructions in accordance with the present invention are explained in more detail below.

Data 835 may be retrieved, stored or modified by processor 820 in accordance with the instructions 840. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format. Moreover, the data may include any information sufficient to identify the relevant information, such as descriptive text, proprietary codes, pointers, references to data stored in other memories (including other network locations) or information which is used by a function to calculate the relevant data.

Although the processor(s) 820 and memory 830 are functionally illustrated in FIG. 8 as being within the same block, it should be understood that the processor(s) 820 and memory 830 may comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors, which may or may not operate in parallel.

In one aspect of the present invention, server(s) 810 communicates with one or more client devices, such as user equipment (UE) 850. Each client device may be configured similarly to the server 810, with at least one processor 852 and memory 854 storing instructions 856 and data 858, as well as a user input device 860 and a user output device, such as display 870. Each client device may include a general purpose computer, intended for use by a person and having all the internal components normally found in a personal computer such as the processor(s) 852 (e.g., a CPU), display 870, optical drive, hard drive or solid state memory, mouse, keyboard, touch-sensitive screen, speakers, microphone, modem and/or router (telephone, cable or otherwise) and all of the components used for connecting these elements to one another.

The server(s) 810 and client computer(s) 850 are capable of direct and indirect communication with other computers, such as over a network 880. Although only a few devices are depicted in FIG. 8, it should be appreciated that a typical system can include a large number of connected servers and client devices, with different devices being at different nodes of the network 880. The network 880, and intervening nodes, may comprise various configurations and utilize various protocols and communications channels including the Internet, intranets, virtual private networks, wide area networks, local networks, private networks using communication protocols proprietary to one or more companies, Ethernet, WiFi and HTTP.

Codec transcoding, support of privileged calls, support for quality feedback and privileged designation, tier enhancements, enhanced scheduling, and other functionality may be implemented by or otherwise performed by the processor(s) of the UEs 850 and/or the processor(s) of the server(s) 810. In one example, any of this functionality may be implemented entirely in a given UE. In another example, any of the functional may be implemented entirely in a given server. In a further example, the functionality may be shared between multiple servers, such as between an eNodeB with an enhanced scheduler, a serving gateway, an MME, a PCRF/PCEF, a SIP server, etc. And in yet another example, the functionality may be shared between a given UE and one or more such servers.

INDUSTRIAL APPLICABILITY

The present invention enjoys wide industrial applicability including, but not limited to, communicating among user devices in wireless communication networks.

The invention claimed is:

1. A method of providing telecommunication service in a wireless communication network, comprising:
   providing a phone application for monitoring call quality;
   checking, by one or more processors, at least one of (i) a status of a subscriber initiating a call on the wireless communication network or (ii) whether the call is indicated as being an important call;
   upon a determination by the one or more processors either that (i) the subscriber is a higher-tier subscriber or (ii) the call has been indicated as being important, the one or more processors designating the call as a higher-tier call;
   in conjunction with designating the call as the higher-tier call, increasing a Quality of Service (QoS) associated with the call, the increasing the QoS comprising at least one of increasing a bandwidth, decreasing a packet latency, and choosing a frequency set with a least amount of connectivity problems the frequency set with the least amount of connectivity problems including two or more distinct frequencies to which packets of the higher-tier call are to be allocated;

monitoring, by the one or more processors, at least one of the bandwidth, the packet latency, the frequency set, and network connectivity problems during the call; and generating, for display in the phone application, a status of at least one of the bandwidth, the packet latency, the frequency set, and the network connectivity problems.

2. The method of claim 1, wherein checking the status of the subscriber initiating the call on the wireless communication network includes checking the status of the subscriber in a lookup table.

3. The method of claim 1, wherein checking whether the call is indicated as being an important call includes checking whether a user of a wireless communication device having the phone application has indicated that the call is an important call.

4. The method of claim 1, wherein the monitoring includes obtaining during the call, by the one or more processors, at least one of (i) current voice quality, (ii) network information pertinent to voice quality, or (iii) codec related information.

5. The method of claim 1, wherein the monitoring includes monitoring one or more of allocated bandwidth, actual bandwidth, or packet loss.

6. The method of claim 1, wherein designating the call as a higher-tier call includes identifying the call as privileged.

7. The method of claim 1, further comprising propagating, by the one or more processors, privilege information regarding the call to a packet scheduler of the wireless communication network.

8. The method of claim 1, wherein checking whether the call is indicated as being an important call includes determining whether a selection was made via the phone application designating the call as the important call.

9. An electronic wireless device comprising:
at least one processor configured to execute instructions stored in a machine-readable medium;
a wireless transmitter, operatively coupled to the at least one processor; and
a memory operatively coupled to the at least one processor, the memory serving as a machine-readable medium and storing processor-executable instructions to cause the at least one processor of the electronic wireless device to perform operations comprising:
providing a phone application for monitoring call quality;
determining at least one of (i) a status of a subscriber initiating a call on the wireless communication network or (ii) whether the call is indicated as being an important call;
upon a determination that (i) the subscriber is a higher-tier subscriber or (ii) the call has been indicated as being important, designating the call as a higher-tier call;
transmitting, to a network element of a wireless communication network, an identifier identifying the designation of the call as being an important call;
choosing a frequency set for conducting the call with a least amount of connectivity problems, the frequency set with the least amount of connectivity problems including two or more distinct frequencies to which packets of the higher-tier call are to be allocated;
monitoring at least one of bandwidth, packet latency, frequency set, and an amount of network connectivity problems; and
generating for display, using the phone application, a status of at least one of the bandwidth, the packet latency, the frequency set, and the amount of network connectivity problems.

10. The electronic wireless device of claim 9, wherein:
determining the status of the subscriber initiating the call on the wireless communication network includes checking the status of the subscriber in a lookup table; and
determining whether the call is indicated as being an important call includes checking whether a user of the electronic wireless device has indicated that the call is an important call.

11. The electronic wireless device of claim 9, wherein the monitoring includes obtaining during the call at least one of (i) current voice quality, (ii) network information pertinent to voice quality, or (iii) codec related information.

12. The electronic wireless device of claim 9, wherein the at least one processor is further configured to transmit, to the network element, quality monitoring information for only selected calls eligible for a higher tier status.

13. A server device of a wireless communication network, the wireless communication network being operatively coupled to a plurality of base stations and a customer record database, the server device comprising:
at least one processor configured to execute instructions stored in a machine-readable medium;
a communication module operatively coupled to the at least one processor, the communication module being configured to communicate with at least one of the plurality of base stations or the customer record database; and
a memory operatively coupled to the at least one processor, the memory serving as a machine-readable medium and storing processor-executable instructions to cause the at least one processor of the communication device to perform operations comprising:
receiving, from an electronic wireless device having a phone application for monitoring call quality, an identifier identifying a designation of a call as being an important call, the designation being associated with at least one of (i) a status of a subscriber initiating a call on the wireless communication network or (ii) whether the call is indicated as being an important call;
choosing a frequency set for conducting the call with a least amount of connectivity problems the frequency set with the least amount of connectivity problems including two or more distinct frequencies to which packets of the higher-tier call are to be allocated;
monitoring, via information from one or more of the plurality of base stations, at least one of bandwidth, packet latency, frequency set, and an amount of network connectivity problems; and
transmitting, to the electronic wireless device, a status of at least one of the bandwidth, the packet latency, the frequency set, and the amount of network connectivity problems for display using the phone application.

14. The server device of claim 13, wherein the at least one processor implements a quality manager to handle call quality related information and commands.

15. The server device of claim 13, wherein the server device embodies an enhanced scheduler configured to analyze information about connectivity quality based on used frequencies, subscriber location, and velocity, and to allocate to the call designated as being an important call one or more frequencies satisfying a connectivity criteria.

16. The server device of claim 13, wherein the at least one processor is configured to receive call quality feedback and to adjust allocated bandwidth for the call based on the received call quality feedback.

17. The server device of claim 13, wherein the server device functions as a quality manager configured to:
   receive one or more of current voice quality information from the electronic wireless device, network information pertinent to voice quality, or codec related information; and
   cause an adjustment to enhance quality of the call based on the received information.

18. The server device of claim 13, wherein the server device is further configured to propagate privilege information regarding the call to a packet scheduler of a given one of the plurality of base stations.

19. The server device of claim 13, wherein the server device is further configured to propagate privilege information regarding the call to another element of the wireless communication network in order to shape packet traffic.

20. The server device of claim 13, wherein the at least one processor of the communication device is further configured to receive, from the electronic wireless device, quality monitoring information for only selected calls eligible for a higher tier status.

21. The server device of claim 13, wherein the server device comprises at least one of a scheduler or a gateway of the wireless communication network.

* * * * *